(12) United States Patent
Peterson, Jr. et al.

(10) Patent No.: US 7,717,048 B2
(45) Date of Patent: May 18, 2010

(54) AGRICULTURAL SEEDING SYSTEM

(75) Inventors: James R. Peterson, Jr., Annawan, IL (US); David J. Rylander, Victoria, IL (US); Garn Penfold, East Moline, IL (US)

(73) Assignee: Deere & Company, Moline, IL (US)

(*) Notice: Subject to any disclaimer, the term of this patent is extended or adjusted under 35 U.S.C. 154(b) by 211 days.

(21) Appl. No.: 11/869,162

(22) Filed: Oct. 9, 2007

(65) Prior Publication Data

US 2009/0090284 A1    Apr. 9, 2009

(51) Int. Cl.
*A01C 7/00* (2006.01)
*A01C 9/00* (2006.01)
*G06F 7/70* (2006.01)
*G06F 19/00* (2006.01)
*G06G 7/00* (2006.01)

(52) U.S. Cl. .................... 111/185; 111/904; 701/50

(58) Field of Classification Search ............... 111/170, 111/177, 183–185, 200, 900, 903, 904; 701/50
See application file for complete search history.

(56) References Cited

U.S. PATENT DOCUMENTS 6,070,538 A    6/2000    Flamme et al.
6,386,128 B1    5/2002    Svoboda et al.
6,752,095 B1    6/2004    Rylander et al.

FOREIGN PATENT DOCUMENTS

DE    102004045655    3/2006
EP    1637026    3/2006
WO    WO99/16004    4/1999

OTHER PUBLICATIONS

European Search Report, Feb. 17, 2009, 5 Pages.

*Primary Examiner*—Christopher J. Novosad
(74) *Attorney, Agent, or Firm*—Taylor & Aust, P.C.

(57) ABSTRACT

A seeding machine having at least one tool bar, a plurality of row units and a processing circuit. Each of the plurality of row units are connected to the toolbar. Each of the row units have a seed metering device, a seed placement device and a seed sensor. The seed metering device includes a seed disk providing a metering action to a plurality of seeds. The seed placement device receives the seeds from the seed metering device. The seed sensor is positioned to detect the passage of seeds through either the metering device or the seed placement device. The seed sensor producing a signal indicative of the passage of the seeds. The processing circuit is receptive of the signal from each of the seed sensors of each of the plurality of row units. The processing circuit determines a seed placement parameter dependent upon the signal, the processing circuit alters the metering action of the seeds dependent on the seed placement parameter.

15 Claims, 6 Drawing Sheets

Fig. 6

AGRICULTURAL SEEDING SYSTEM

FIELD OF THE INVENTION

The present invention relates to agricultural seeding machines, and, more particularly, to the monitoring of the placement of seed in a trench by a seeding machine.

BACKGROUND OF THE INVENTION

An agricultural seeding machine, such as a row crop planter or grain drill, places the seed at a desired depth within a plurality of parallel seed trenches formed in soil. In the case of a row crop planter, a plurality of row crop units are typically ground driven using wheels, shafts, sprockets, transfer cases, chains and the like. Each row crop unit has a frame, which is movably coupled with a tool bar. The frame may carry a main seed hopper, herbicide hopper and insecticide hopper. If the granular herbicide and insecticide are used, the metering mechanisms associated therewith for the dispensing of the granular product into the seed trench are relatively simple. On the other hand, mechanisms necessary to properly meter seeds at a predetermined rate and to place the seeds at a predetermined relative locations and depth within the seed trench are relatively complicated.

The mechanisms associated with metering and placing of the seeds generally can be divided into a seed metering system and a seed placement system, which are in communication with each other. The seed metering system receives the seeds in a bulk manner from a seed hopper carried by the frame. Different types of seed metering systems can be used such as seed plates, finger plates and seed disk. In the case of a seed disk metering system, a seed disk is formed with a plurality of seed cells spaced about the periphery thereof. Seeds are moved into the seed cells with one or more seeds in each seed cell depending upon the size and configuration of the seed cell. A vacuum or positive pressure airflow may be used in conjunction with the seed disk to assist in movement and retention of the seeds in the seed cells. The seeds are singulated and discharged at a predetermined rate to the seed placement system.

The seed placement system may be categorized as a gravity drop system or a power drop system. In the case of a gravity drop system, a seed tube has an inlet end, which is positioned below the seed metering system. The singulated seeds from the seed metering system merely drop into the seed tube and fall by way of gravitational force from a discharge end thereof into the seed trench. The seed tube may be curved in a rearward manner to assist in directing the seed into the seed trench A seed placement system of the power drop variety generally can be classified as a seed conveyor belt drop, rotary valve drop, chain drop or air drop. These types of seed placement systems provide somewhat consistent placement of the seeds along a predetermined path at a desired spacing.

Certain seed types, such as flat corn seed with insecticide or other treatments thereon are difficult for vacuum meters to singulate. Poor singulation of difficult seed types is characterized by doubles, skips and bunches of seed carried by the disk. Doubles and skips refer to multiple seeds and no seed, respectively, in each seed cell. Bunches are multiple seeds carried by the seed pool accelerators, which protrude from the surface of the seed disk. These seed types generally are best planted with a flat seed disk in combination with a doubles eliminator.

What is needed in the art is an agricultural seeding machine having an accurate positive seed spacing monitor and an efficient adjustment of a seed metering system.

SUMMARY OF THE INVENTION

The invention includes a seeding machine having at least one tool bar, a plurality of row units and a processing circuit. Each of the plurality of row units are connected to the toolbar. Each of the row units have a seed metering device, a seed placement device and at least one seed sensor. The seed metering device includes a seed disk providing a metering action to a plurality of seeds. The seed placement device receives the seeds from the seed metering device. The seed sensor is positioned to detect the passage of seeds through either the metering device or the seed placement device. The seed sensor producing a signal indicative of the passage of the seeds. The processing circuit is receptive of the signal from each of the seed sensors of each of the plurality of row units. The processing circuit determines a seed placement parameter dependent upon the signal, and the processing circuit alters the metering action of the seeds dependent on the seed placement parameter.

In another form, the invention includes a method of altering seed output of a seeding machine, the method including the steps of detecting a seed placement parameter of seeds being processed through either a seed metering device or a seed placement device and altering the seed placement parameter of the seeds dependent upon a target seed spacing criteria.

DETAILED DESCRIPTION OF THE INVENTION

Figure 1:
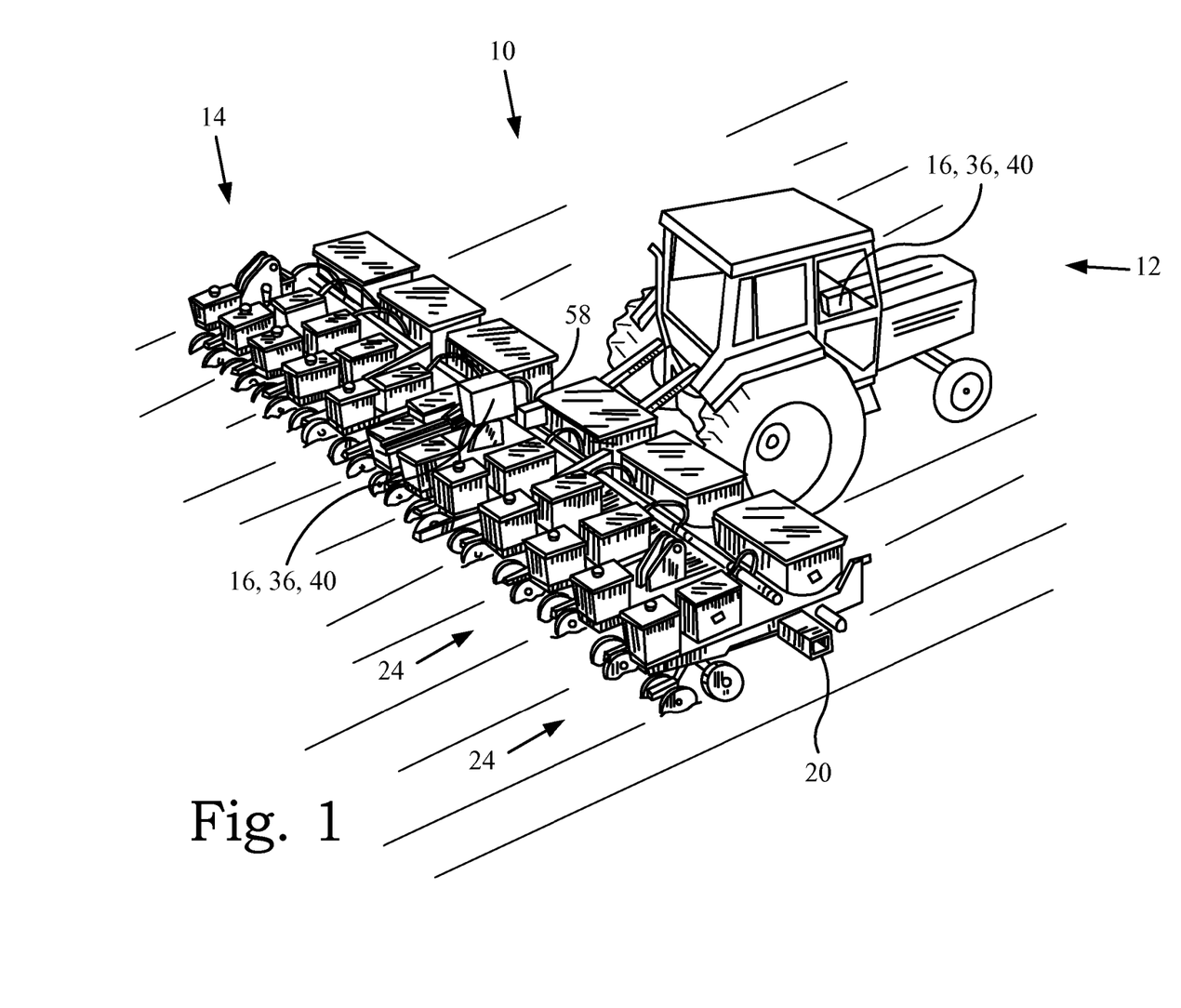
FIG. 1 is a perspective view of an agricultural seeding machine incorporating an embodiment of a monitoring and control unit of the present invention.
Figure 2:
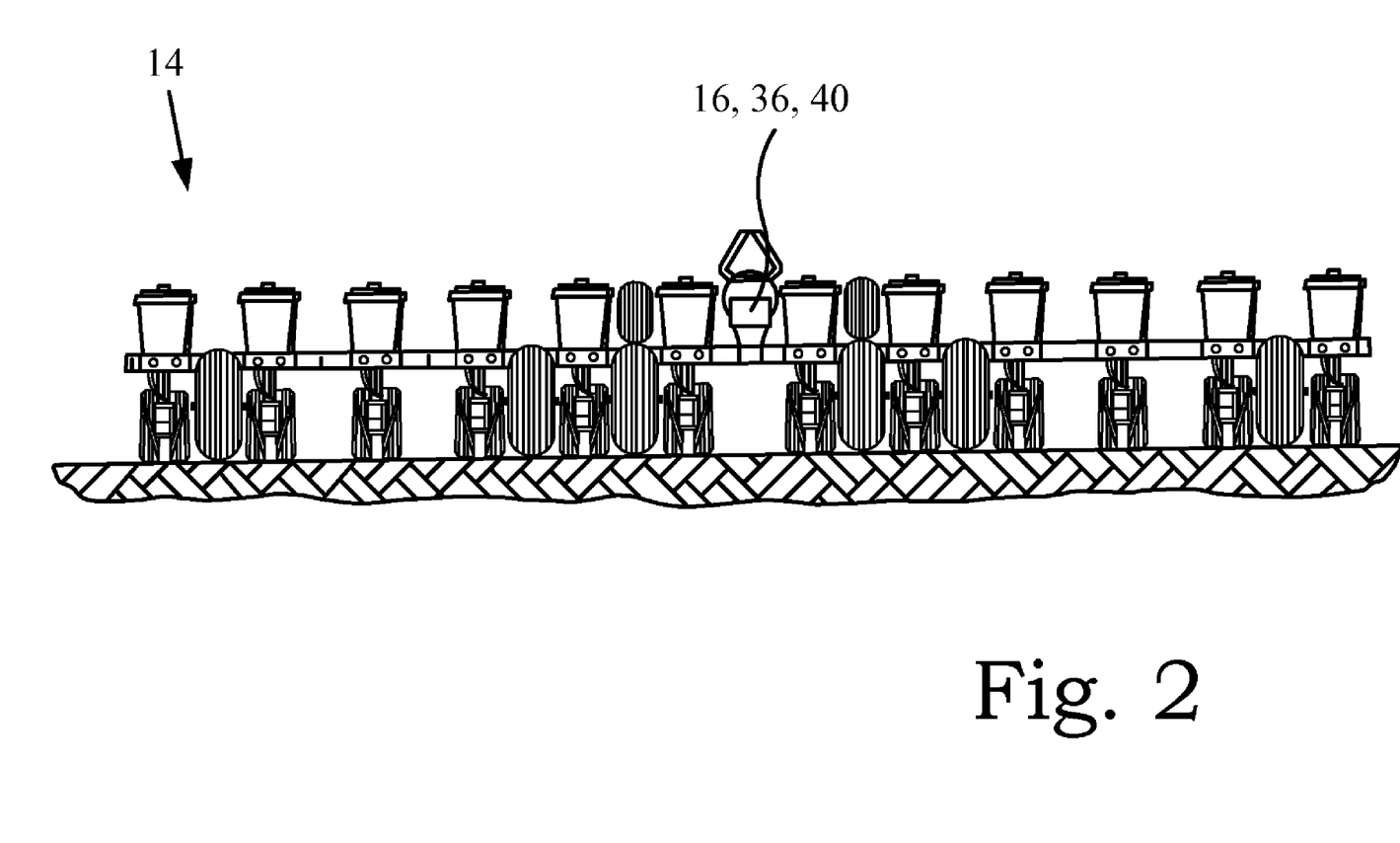
FIG. 2 is an end view of the seeding machine having the monitoring and control unit as shown in FIG. 1.

Referring now to the drawings, and more particularly to FIG. 1, there is shown an agricultural system 10 including a tractor 12 and seeding machine 14. Seeding machine 14 is in the form of a row crop planter 14, but could be a grain drill. Tractor 12 provides the motive power for planter 14 and the mechanisms therein. A seed spacing monitoring/control system 16 is incorporated and used by the operator of tractor 12 to monitor the placing of seeds, from planter 14. An adjusting system 18 allows monitoring/control system 16 to alter the retention of seeds in a metering system in planter 14.

Now, additionally referring to FIGS. 2-6, there is shown details of planter 14 that includes tool bar 20, seed supply 22, row units 24 each including a metering device 26 having a seed disk 28 with holes 30 therein and a doubles eliminator 32. Doubles eliminator 32 is also known as a singulator 32 which is positioned in an adjustable manner so as to prevent two seeds from being associated with each hole 30 in seed disk 28. Metering devices 26 are either directly or indirectly connected to tool bar 20 that is in turn coupled with tractor 12. Seed is supplied to metering devices 26 by way of seed supply 22 and the seed is pooled over a portion of seed disk 28. Seed disk 28 is fluidly coupled to an airflow generator that supplies airflow to a cavity 46 and/or a cavity 48. The airflow generator may have an adjustable airflow that is under the control of adjusting system 18. The airflow generator may produce a positive or negative pressure depending on the configuration of planter 14, for ease of explanation the airflow will be understood to be a vacuum system. Airflow caused by the vacuum system is supplied to cavities 46 and/or 48 and thereby to one side of seed disk 28 causing air to flow through holes 30. The air flowing through holes 30 attracts seeds thereto as seed disk 28 is rotated through the pooled seeds in metering device 26. Seeds are connected with holes 30 and rotate from the pooled seeds to a point of discharge, as illustrated as a dashed line in FIG. 6, from metering device 26 so that it may travel, by way of a seed placement system 50, to the prepared trench in the soil.

Figure 3:
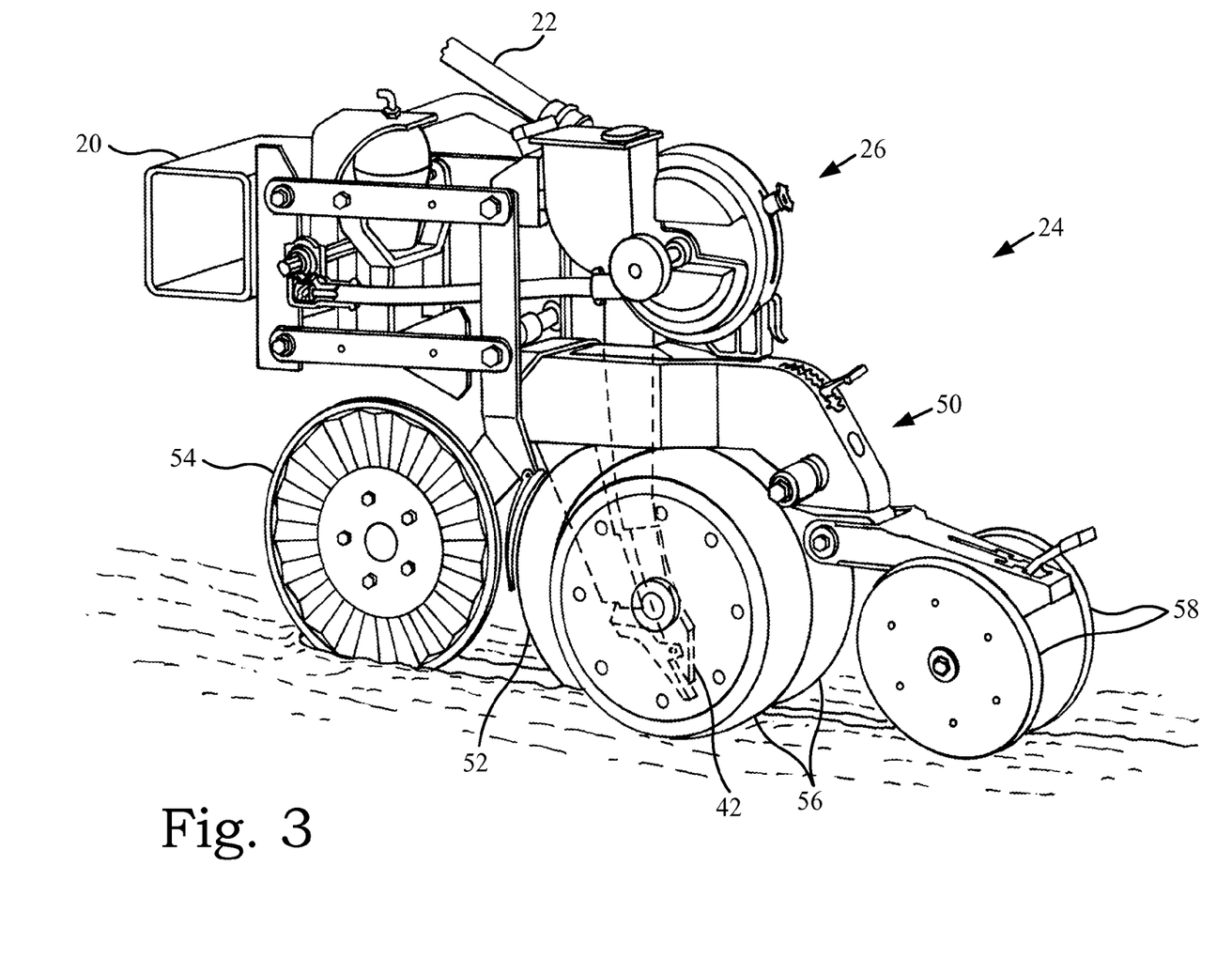
FIG. 3 is a perspective view of a row unit having a metering and placement system that can be used in an embodiment of the seeding machine of FIGS. 1 and 2.

Row unit 24 additionally carries a double disc furrow opener 52 for forming a seed trench in the soil. An optional coulter wheel 54, particularly for use in no-till situations, may be placed ahead of double disc furrow opener 52. A pair of gauge wheels 56 are respectively associated with the pair of discs of double disc furrow opener 52. More particularly, each gauge wheel 56 is positioned generally in line with and immediately adjacent to the outside of each respective disc of double disc furrow opener 52. Each gauge wheel 56 may be vertically adjusted to adjust the depth of the trench which is cut into the soil using double disc furrow opener 52.

A pair of closing wheels 58 is also part of row unit 24. Closing wheels 58 are positioned generally in line with double disc furrow opener 52. Closing wheels 58 are preferably biased in a downward direction and have a peripheral edge with a shape which may vary, depending upon the application.

Seed placement system 50 is shown in the form of a gravity drop seed tube 42, but could be configured differently, such as a power drop seed placement system with a powered wheel, etc.

Figure 4:
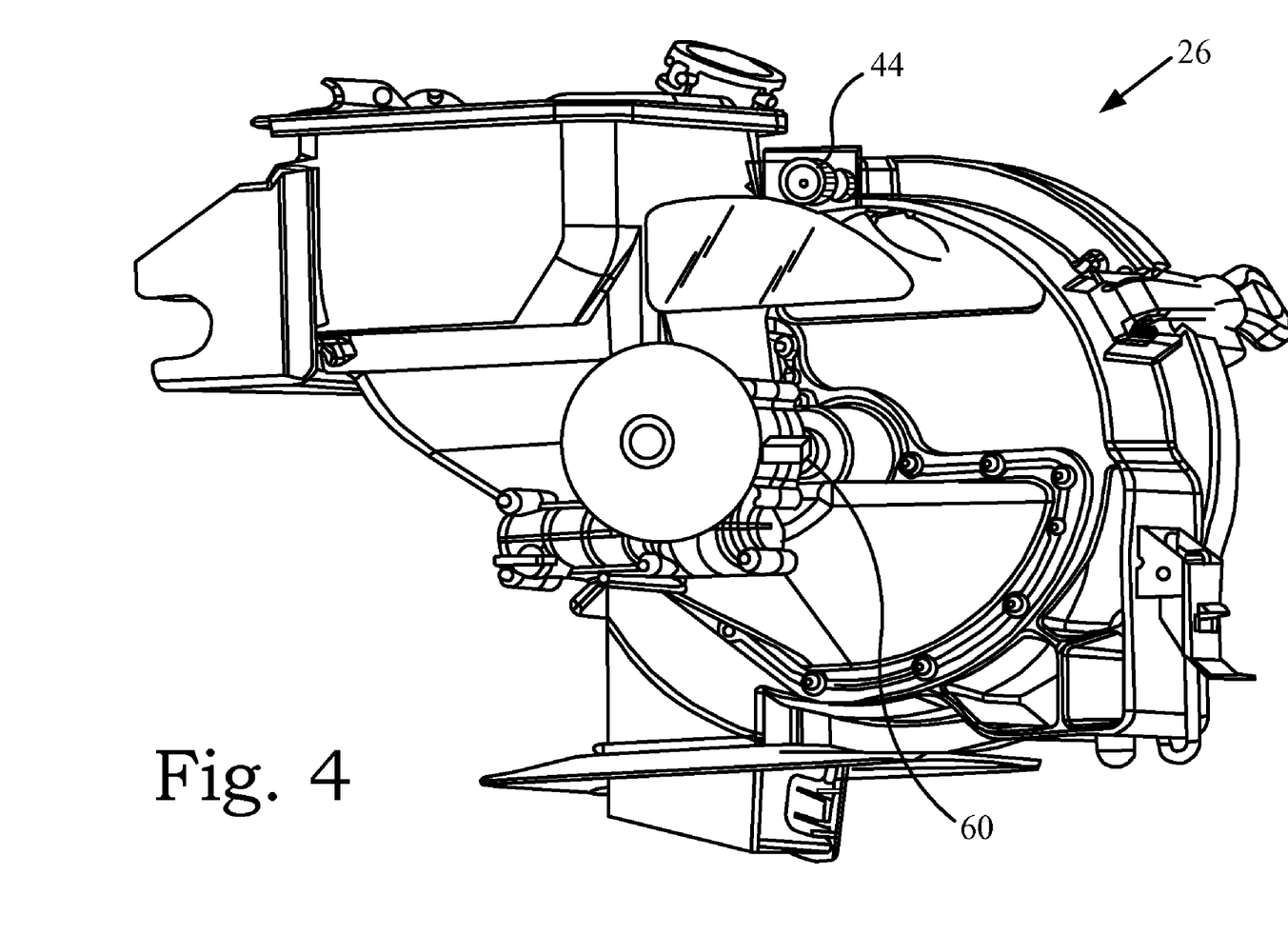
FIG. 4 is a perspective view of a metering system used by the row unit of FIG. 3.
Figure 5:
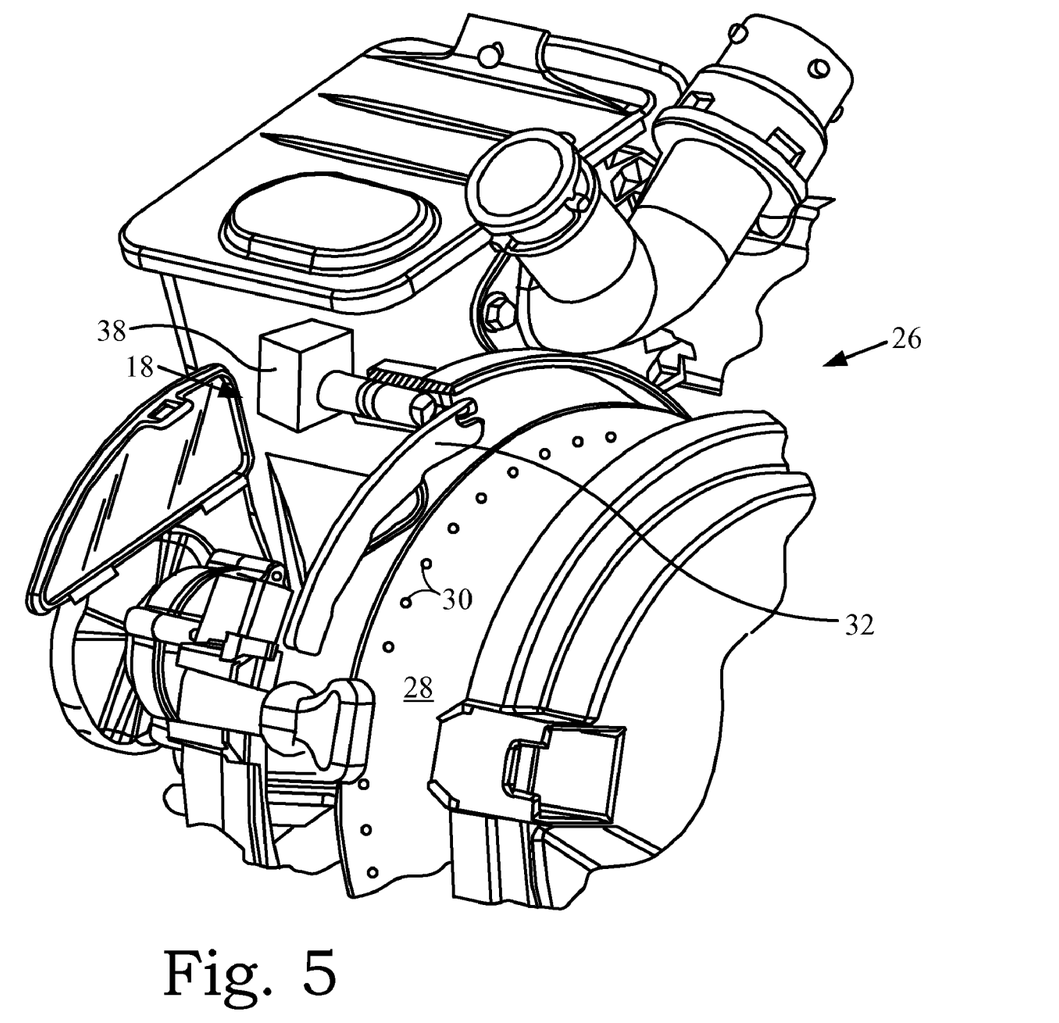
FIG. 5 is a perspective partially exploded view of the metering system shown in FIG. 4.
Figure 6:
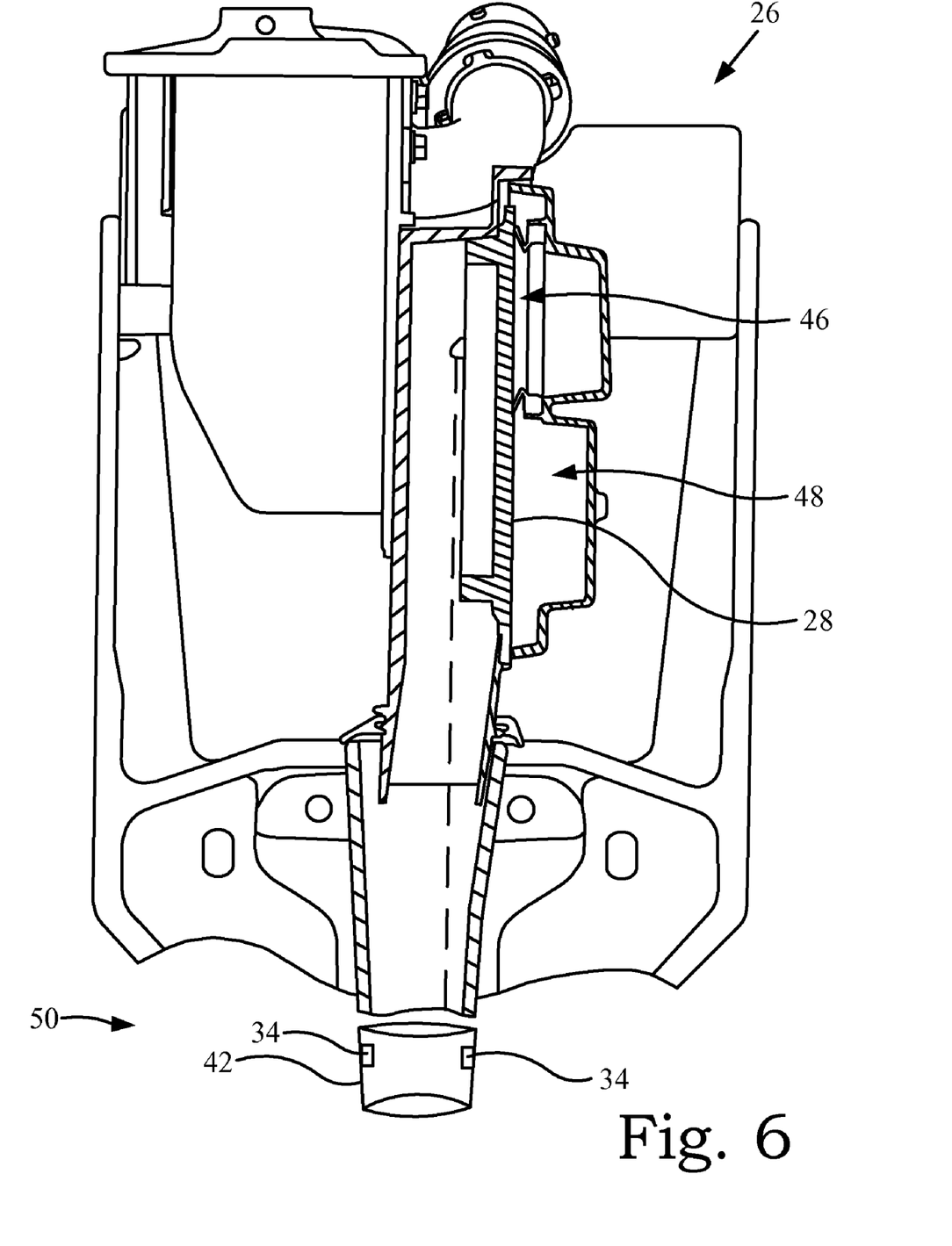
FIG. 6 is a partially sectioned view of the metering system of FIGS. 4 and 5.

Seed metering system 26 receives seed from a main seed supply, such as seed from a distant main seed hopper which is supplied via air or the like, or a seed hopper carried by tool bar 20 or a frame of row unit 24. Within the housing of metering system 26 there is a seed pool area. Seed disk 28 has a plurality of holes 30 having seed cells on the seed side of disk 28 intermittently spaced about the periphery thereof. The vacuum airflow promotes entry of the seeds into the seed cells and maintains the seeds in place within the seed cells. Seeds are transported from the seed cells to seed placement system 50. Of course, seed meter 26 may be configured with a positive pressure to assist in seed movement rather than a vacuum pressure.

Doubles eliminator 32 is adjustable in the manual sense as shown in FIG. 4 where manual adjustor 44 can be seen. Manual adjustor 44 is adjusted to move doubles eliminator 32 relative to seed disk 28 so that seed that is passing thereby may be reduced so that each hole 30 carries only one seed. The adjustment of doubles eliminator 32 is desirable so that seeding occurs at the proper rate and optimal seed placement. Manual adjustment is often ignored by the operator since it is time consuming and not convenient to leave the tractor cab and adjust the several manual adjustors 44.

Row crops require accurate population levels or seeding rates to achieve maximum yields. Some crops, such as corn and cotton, yield best with even, precise plant spacing or plant-to-plant distances within a given row. The present invention evaluates the spacing of the seeds to achieve a consistent control of the plant-to-plant spacing of the seeds thereby optimizing yield over a field having the same seeding population but not having precise plant spacing.

As the seed departs from metering device 26, flows through seed tube 42 and is sensed by seed sensor 34, as illustrated in FIG. 6. a signal is generated by seed sensor 34 that is sent to an electronic processing circuit that may be in monitoring system 16. A display 36 on monitoring system 16 provides information to the operator in the form of the percentage of skips, the percentage of double seeding, the actual or average spacing of the seed. The processing circuit receives a signal from seed sensor 34 to thereby convey a seed placement parameter, which in the embodiment shown is in the form of the timing between the passage of each seed. The processing circuit additionally receives a speed signal that relates to a speed of tractor 12 and/or planter 14 upon the ground from a speed sensor 58. Speed sensor 58 may be on tractor 12 or planter 14 and the signal is representative of the speed of planter 14 across the ground. The speed signal may be conveyed to the processing circuit by way of a communication of the signal from tractor 12, or the speed can be determined by the placement of speed sensor 58 on planter 14 with speed sensor 58 being associated with a ground contacting wheel, a global positioning system, a sonar system directed at the ground or a radar system directed at the ground.

In another embodiment of the present invention the speed signal used by the processing system is the rotational speed of seed disk 28. Rotational sensor 60 is associated with seed disk 28 and produces a signal that is representative of the rotational speed of seed disk 28. The signal of rotational sensor 60 that relates to the rotational speed of seed disk 28 is used by the processing circuit along with the signal from seed sensor 34 to produce a seed placement parameter that is used by the processing circuit as an evaluation of the performance of seed disk 28 and if the seed placement parameter is not within a target range, then adjusting system 18 is used to alter the performance of metering device 26 to bring the seed placement parameter within the target range. The seed placement parameter can among other things be considered to be a spacing between the seeds. Additionally, the processing circuit can utilize a predetermined timing as a criteria for the spacing of the seeds, such that a certain predetermined window of time is used and one or more seeds are expected to pass seed sensor 34 within this predetermined time. If a predetermined number of seeds does pass seed sensor 34 in the window of time then the spacing is considered on target, such as may occur with the doubles or skips. Conversely if the seed fails to pass or passes outside of the window then the spacing is considered to not be on target. Alternatively, a predetermined movement of seed disk 28 can be compared to the number of seeds that are placed as a determination of seed placement. For example, one revolution of seed disk 28 can include the placement of a specific number of seeds, such as 24 seeds. A variation from this number of seeds per revolution indicates that an adjustment is needed. If the predetermined movement is equivalent to one seed cell then the detection of each seed is correlated on a one-to-one basis to the movement of seed disk 28.

Adjusting system 18 includes an actuator 38 associated with each metering device 26 and controls 40 associated with a display 36 so that doubles eliminator 32 and/or airflow from airflow generator 22 can be adjusted, thereby altering the performance of seed disk 28 and the placement of seed in the seeding trench.

Seed sensor 34 may be in the form of an optical sensor with a light source located on one side of seed tube 42 and a light sensor on an opposite side of seed tube 42. Seed sensor 34 provides input to determine the time between the seeds as they travel by sensor 34. Seeds that are too close based upon a target population, row spacing and speed indicates that more than one seed for the time period has been supplied by metering device 26. Seeds that are too far apart in time indicates a skip situation. This information can be displayed on display 36 and controls 40 allow the operator to adjust doubles eliminator 32 by activating actuator 38 to either become more aggressive against doubles or less aggressive. Additionally the airflow supplied to seed disk 28 can be adjusted by either altering the speed of the fan causing the vacuum or adjusting the airflow supplied to cavities 46 and/or 48 of each metering device 26. Further, adjusting system 18 can include the adjusting of the speed of an electric, hydraulic or other drive that may be connected to seed disk 28, to thereby alter the seed spacing. If doubles eliminator 32 is positioned too aggressively it may knock the seeds off the disk causing skips in the planting sequence. Display 36 as well as control 40 may form an integral unit and may be positioned on the back of planter 14 so that the operator can monitor each metering device 26 while actually watching seed being delivered thereby. Additionally, display 36 and controls 40 may be located in an operating position such as a cab of tractor 12 so that operation of metering devices 26 can be adjusted while planter 14 is in operation. The seed to seed distance is information not available in the prior art and is utilized to drive the feedback mechanism of actuator 38 or the vacuum level supplied by the vacuum system to optimize the seed spacing supplied by seed disk 28. This is used to great advantage if corn is being planted with different varieties of seeds in row units 24. For example, when a hybrid seed corn is to be produced in which certain row units 24 may have one specific corn variety and other row units 24 will have a different corn variety, the individual sensing of seed spacing by each row unit 24 is utilized to individually adjust the retention of seeds by seed disk 28, as planter 14 operates across the field. While the adjustment of a double eliminator has been manually available for some time, the feedback from a seed sensor and the ability of the operator to select an automatic adjustment mode or a selected adjustment mode of the double eliminator, seed disk rotational speed and/or airflow is a particularly useful aspect of the present invention.

As sensor 34 detects a seed a signal is produced that is sent to monitoring system 16. Monitoring system 16 detects the spacing between the seeds when the seeds leave metering device 26 or when they pass through placement system 50. Monitoring system 16 conveys information to the control system and adjusting system 18 all of the processing functions being carried out by the processing circuit, which may be located in monitoring system 16. The retention of the seeds to seed disk 28 is altered dependent on the spacing of the seeds. The criteria for the acceptable percentage of skips and doubles can be input into monitoring/control system 16 and doubles eliminator 32 and/or the airflow to a specific metering device 26 is adjusted by adjusting system 18 based on violations of the criteria. If the number of skips is too high the airflow may be increased and/or doubles eliminator 32 will be adjusted to be less aggressive. If the percentage of doubles is too high then the airflow to the metering device 26 is decreased and/or doubles eliminator 32 is adjusted to be more aggressive.

The processing circuit in monitoring system 16 carries out the functions of receiving the signal from seed sensor 34. The signal being representative of seed passing through seed tube 42. The processing circuit determines by calculation or from a look-up table, compliance with a target seed spacing criteria and sends commands to actuator 38 to alter the seed spacing and/or the retention of seeds to disk 28. The percentage of skips, percentage of doubles, current spacing of the seeds and average spacing of the seeds is determined by the processing circuit. This information is displayed on display 36 and can be used to alter the spacing of the seeds by the processing circuit sending a signal or a command to actuator 38. The target seeding criteria can be as simple as a number representative of the desired spacing between the seeds, can include the allowable percentage of skips, percentage of doubles, current spacing of the seeds and average spacing of the seeds, or even vary by locations in the field and vary from row unit to row unit.

Having described the preferred embodiment, it will become apparent that various modifications can be made without departing from the scope of the invention as defined in the accompanying claims.

The invention claimed is:

1. A seeding machine, comprising:
   at least one toolbar;
   a plurality of row units connected to said toolbar, each of said row units having:
   a seed metering device including a seed disk providing a metering action to a plurality of seeds;
   a seed placement device receiving the seeds from said seed metering device; and
   a seed sensor positioned to detect the passage of seeds through one of said metering device and said seed placement device, said seed sensor producing a signal indicative of the passage of the seeds; and
   a processing circuit receptive of said signal from each said seed sensor of each of said plurality of row units and determining a seed placement parameter dependent upon said signal, said processing circuit altering said metering action of the seeds dependent on said seed placement parameter.

2. The seeding machine of claim 1, wherein said seed placement parameter is a spacing of the seeds.

3. The seeding machine of claim 2, further comprising a ground speed sensor providing a speed signal to said processing circuit, said processing circuit determining said spacing of the seeds dependent upon said speed signal.

4. The seeding machine of claim 2, further comprising a seed disk speed sensor associated with said seed disk, said seed disk speed sensor providing a speed signal to said processing circuit, said processing circuit determining said spacing of the seeds dependent upon said speed signal.

5. The seeding machine of claim 2, wherein said seed metering device includes at least one of a doubles eliminator, an airflow altering device and an adjustable speed drive for said seed disk adjustingly coupled to said processing circuit.

6. The seeding machine of claim 5, wherein said seed metering device includes said doubles eliminator adjustingly coupled to said processing circuit.

7. The seeding machine of claim 6, wherein said metering device further includes an actuator connected to said doubles eliminator, said metering action includes altering a retention of the seed to said disk, said doubles eliminator altering said retention by being at least partially positionally altered by said actuator.

8. The seeding machine of claim 7, wherein said processing circuit is a part of a seeding monitor located at a rear portion of the seeding machine, said seeding monitor having a display area directed toward said rear portion of the seeding machine.

9. The seeding machine of claim 7, wherein said processing circuit includes a selectable adjustment to alter at least one of said spacing and a seeding population.

10. The seeding machine of claim 7, wherein said processing circuit is a part of a seeding monitor, said seeding monitor determines and displays at least one of percentages of skips, percentages of doubles, seeding population, current spacing and average spacing of the seed.

11. The seeding machine of claim 1, wherein said seed placement parameter is a predetermined time window in which the seed is expected to pass said seed sensor.

12. A row unit for use on a seeding machine having a seeding monitor, the row unit comprising:
- a seed metering device including a seed disk providing a metering action to a plurality of seeds;
- a seed placement device receiving the seeds from said seed metering device;
- a seed sensor positioned to detect the passage of seeds through one of said metering device and said seed placement device, said seed sensor producing a signal indicative of the passage of the seeds; and
- a processing circuit receptive of said signal from said seed sensor, said processing circuit determining seed placement parameter of the seeds dependent upon said signal, said processing circuit altering said metering action of the seeds dependent on said seed placement parameter.

13. The row unit of claim 12, wherein said seed metering device includes at least one of a doubles eliminator, an airflow altering device and an adjustable disk drive adjustingly coupled to said processing circuit.

14. The row unit of claim 13, wherein said seed metering device includes said doubles eliminator adjustingly coupled to said processing circuit.

15. The row unit of claim 14, wherein said metering device further includes an actuator connected to said doubles eliminator, said metering action includes altering a retention of the seed to said disk, said doubles eliminator altering said retention by being at least partially positionally altered by said actuator.

* * * * *